United States Patent [19]

Rinkewich

[11] Patent Number: 4,489,888
[45] Date of Patent: Dec. 25, 1984

[54] IRRIGATION SYSTEM

[76] Inventor: Isaac Rinkewich, 12 Fishman Maiman St., Tel Aviv, Israel, 64236

[21] Appl. No.: 437,239

[22] Filed: Oct. 28, 1982

[51] Int. Cl.³ .............................................. B05B 3/00
[52] U.S. Cl. .................................... 239/183; 239/178; 239/184
[58] Field of Search .............. 239/711, 183, 184, 178, 239/177

[56] References Cited

U.S. PATENT DOCUMENTS

| | | | |
|---|---|---|---|
| 4,003,519 | 1/1977 | Kruse et al. | 239/189 X |
| 4,274,584 | 6/1981 | Noble | 239/183 X |
| 4,295,607 | 10/1981 | Noble | 239/183 X |

FOREIGN PATENT DOCUMENTS

2402916  7/1974  Fed. Rep. of Germany ...... 239/183

Primary Examiner—Andres Kashnikow
Assistant Examiner—Kevin P. Weldon
Attorney, Agent, or Firm—Benjamin J. Barish

[57] ABSTRACT

An irrigation system comprises a water supply line located on the ground having a plurality of equally spaced valve assemblies and an irrigation machine movable along the water supply line. The irrigation machine comprises a base frame situated on the ground to move along the water supply line, propelling means provided on the base frame for moving the base frame along the water supply line at a constant speed, water transfer means on the base frame for supplying water onto the ground, and a coupling assembly on the base frame. The coupling assembly includes at least two coupling sections connected to each other to freely move relative to the base frame so that when one of the coupling sections is moved in one direction along the longitudinal direction of the base frame, the other coupling section is moved in the opposite direction along the longitudinal direction of the base frame. The coupling sections are connected to the water transfer means at respective ends and are engaged at the other end with one of the valve assemblies of the water supply line alternately. At least one of the coupling sections is always connected to one of the valve assemblies.

10 Claims, 13 Drawing Figures

IRRIGATION SYSTEM

BACKGROUND OF THE INVENTION AND PRIOR ART STATEMENT

The present invention relates to an irrigation system and more particularly a system for supplying water onto an extensive area of land.

When water is supplied onto land for irrigation purposes sprinklers are attached to a water supply line disposed on the ground to eject water therethrough. If the area of the land to be irrigated is small, this water supply system is satisfactory. However, in cases where the land to be irrigated is large, this sprinkler system is not suitable because of the limit of the water supply capacity.

Therefore, mobile type irrigation machines have been used for irrigation of large areas of land. When mobile type irrigation machines are used, a water supply line has to be located on the land to be irrigated and valve assemblies are provided thereon equally spaced from each other. The irrigation machine is advanced along the water supply line, and while advancing, the machine is connected to the valve assemblies step-by-step so that the machine receives water from the water supply line and sprinkles water therefrom.

U.S. Pat. Nos. 4,036,436 and 4,172,556 relate to a self-propelled linear irrigation system in which a tractor is moved along a water supply line to supply water onto the ground from the water supply line. The tractor comprises a central rigid section and front and rear valve cars connected to the central section. The central section moves constantly, but the front and rear valve cars move intermittently so that one of the cars is always connected to the water supply line. Consequently, water is supplied from one of the cars to the central section and the water sprinkles therefrom.

U.S. Pat. No. 4,274,584 also relates to a land irrigation system in which an irrigation machine comprises a tractor, and two pipe assemblies movably connected to the front and rear ends of the tractor. The machine moves constantly along a water supply line, but the pipe assemblies move intermittently so that one of the pipe assemblies is always connected to the water supply line to sprinkle water from the tractor.

The above prior art devices involve large equipment and three moving parts always have to be controlled properly. Therefore, such prior irrigation machines are complicated and are not easily operated.

Accordingly, an object of the invention is to provide an irrigation system in which, when an irrigation machine is moved constantly along a water supply line, the irrigation machine automatically receives water from the water supply line and sprinkles water onto the land.

Another object of the invention is to provide an irrigation system which can be operated at low cost and low maintenance with high reliability.

A further object of the invention is to provide an irrigation machine for sprinkling water onto land, which can operate simply by moving the irrigation machine along the water supply line.

A still further object of the invention is to provide an irrigation machine in which all the moving parts can be controlled and operated by water supplied from a water supply line without an external source of energy.

A still further object of the invention is to provide an irrigation machine in which the energy sequence of operation is positive and depends directly on the previous operation.

A still other object of the invention is to provide a method of irigating land along a water supply line which can be simply and reliably operated.

A still further object of the invention is to provide a valve assembly adapted to use for a water supply line for irrigation.

Further objects and advantages of the invention will be apparent from the following description of the invention.

SUMMARY OF THE INVENTION

In accordance with the present invention, there is provided an irrigation system for sprinkling water onto land. The irrigation system comprises a water supply line located on the ground having a plurality of valve assemblies equally spaced from each other and an irrigation machine movable along the water supply line.

The irrigation machine comprises a base frame situated on the ground and movable along the water supply line, propelling means provided on the base frame for moving the base frame at a constant speed, a water transfer means attached to the base frame for supplying water onto the ground through a sprinkler assembly, and a coupling assembly situated on the base frame. The coupling assembly includes at least two coupling sections connected to each other to freely move relative to the base frame so that when one of the coupling sections is moved in one direction along the longitudinal direction of the base frame, the other coupling section is thereby automatically moved in the opposite direction along the longitudinal direction of the base frame. The coupling sections are connected to the water transfer means at respective ends and are engaged at the other ends with one of the valve assemblies of the water supply line alternately. At least one of the coupling sections is always connected to one of the valve assemblies. Consequently, when the base frame is moved forwardly, the coupling sections are moved and connected to the valve assemblies to continuously supply water to the ground through the sprinkler assembly.

The irrigation machine further includes means connecting the two coupling sections to the water transfer means supplying water thereto when either coupling section is connected to the water supply line by one of the valve assemblies. Each of the two coupling sections includes: first position detection means for detecting when the respective coupling section has reached the end of the base frame; second position detection means for detecting when the respective coupling section overlies a valve assembly; drive means for driving its respective coupling section to an extended position for engagement with a valve assembly, or to a retracted position for disengagement from a valve assembly; valve means controlling the flow of water from a connected valve assembly to the respective coupling section; flow detection means for detecting the flow of water from a connected valve assembly to the respective coupling section; and control means controlled by the first and second position detection means such that when the first position detection means of one coupling section detects that its coupling section has reached the end of the base frame, and the second position detection means detects that the respective coupling section overlies a valve assembly, they together actuate the drive means for the respective coupling section to extend same into engagement with the respective valve assembly, to cause the valve means for the respective coupling section to open and to produce a flow of water to the respective coupling section. The flow detection means for the respective coupling section then closes the valve means for the other coupling section and actuates the drive means of the other coupling section to retract same from the previously-coupled valve assembly.

The valve assembly attached to the water supply line comprises a valve body connected to the water supply line and having inner and outer openings, the inner opening dividing the valve body into inner and outer chambers, pressure means connected to the valve body and having a piston adapted to sealingly engage the inner opening, a first spring to urge the piston to engage the inner opening, and a diaphragm connected to the piston to selectively apply pressure from the water supply line to the piston, the diaphragm defining a pressure chamber in the pressure means, and a switch for controlling the pressure applied to the diaphragm so that the piston moves to allow water to flow through the valve body.

The pressure means further comprises a pressure line extending from the inner chamber in the valve body to the pressure chamber in the pressure means through the switch. Consequently, when the switch is in an off-position to allow water pressure in the inner chamber to communicate with the pressure chamber, pressure in the pressure chamber is higher than that in the inner chamber due to the first spring in the pressure chamber to thereby urge the piston toward the inner opening to close the valve. On the contrary, when the switch is in an on-position, the pressure in the pressure chamber is lower than that in the inner chamber in spite of the first spring in the pressure chamber to thereby move the piston away from the inner opening to open the valve.

A method of irrigating land along the water supply line having equally spaced valve assemblies comprises moving the base frame at a constant speed along the water supply line, connecting the first coupling section of the coupling assembly to the first valve assembly on the water supply line, the first coupling section being connected to at least the second coupling section of the coupling assembly, the coupling assembly being freely moved around the base frame so that when the base frame is moved forwardly and the first coupling section is connected to the first valve assembly on the water supply line, the second coupling section is moved forwardly along the base frame, connecting the second coupling section to the second valve assembly on the water supply line next to the first valve assembly, disconnecting the first coupling section from the first valve assembly soon after the second coupling section is connected to the second valve assembly, so that the second coupling section moves rearwardly and the first coupling section moves forwardly, and sprinkling water onto the ground through water transfer means on the base frame and the sprinkler assembly, the water transfer means receiving water from the water supply line through the coupling assembly and supplying water to the sprinkler assembly.

DETAILED DESCRIPTION OF THE PREFERRED EMBODIMENTS

Figure 1:
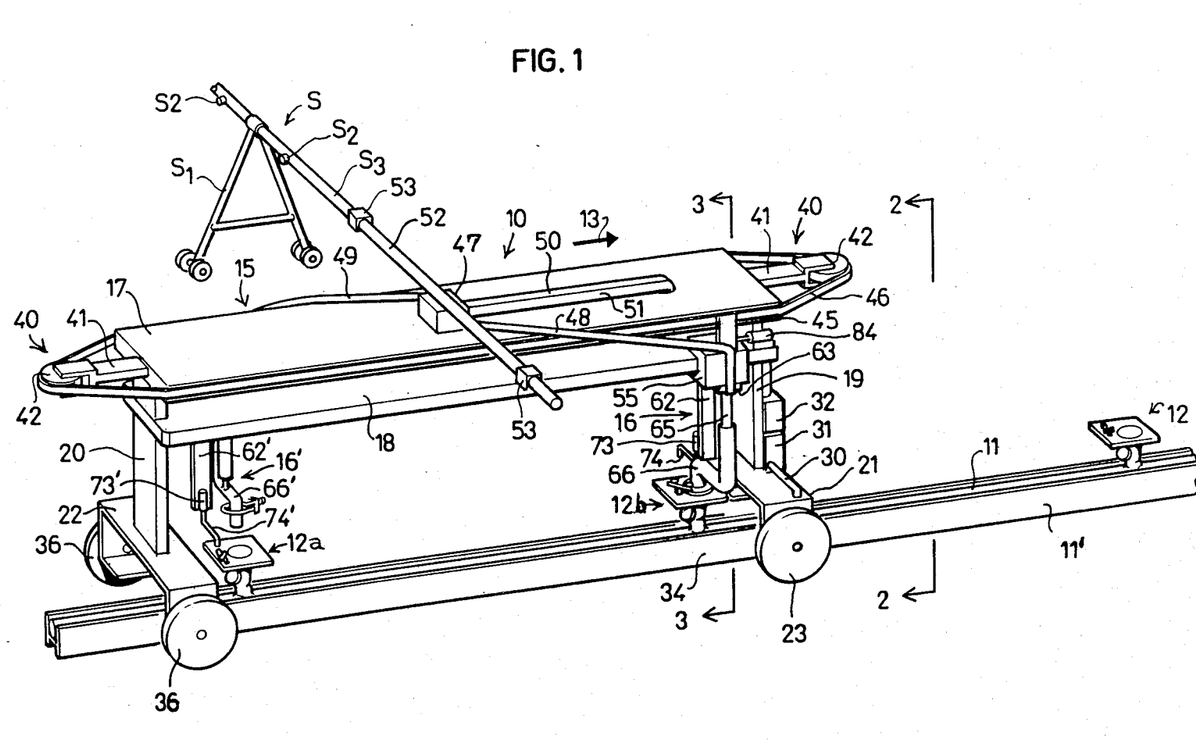
FIG. 1 is an explanatory perspective view of an irrigation machine in accordance with the present invention, in which the irrigation machine is engaged with a water supply line.

Referring to FIG. 1, one embodiment of an irrigation machine 10 is shown in which the irrigation machine 10 is disposed on the ground and located above a water supply line 11 having valve assemblies 12 equally spaced from each other. In this embodiment, the irrigation machine 10 is connected to a sprinkler assembly S including sprinkler supports S1 and sprinkler nozzles S2 and is designed to move at a constant speed along the water supply line 11 carrying the sprinkler assembly S in the direction shown by arrow 13, although the machine 10 can also be moved in the opposite direction. The irrigation machine 10 is always connected to one of the valve assemblies 12 so that water can always be supplied onto the ground from the sprinkler nozzles S2 as the machine moves along the supply line 11.

The irrigation machine 10 comprises an elongated frame 15 and two connector mechanisms 16, 16' connected to each other to freely move relative to the frame 15. The elongated frame 15 includes upper and lower plates 17, 18, front and rear vertical plates 19, 20 connected to the plates 17, 18, and front and rear base plates 21, 22 connected to the vertical plates 19, 20 respectively. Two front wheels 23 are attached to the front base plate 21 by means of shafts 24 having gears 25. The gears 25 are engaged with gears 26 of shafts 27, the shafts 27 having at the other end gears 28 engaging gears 29 of a shaft 30 extending from a gear box 31. The gear box 31 is connected to a hydraulic motor 32 by means of a shaft 33 so that the front wheels 23 are rotated to advance the machine 10 while the motor 32 is operated. The advance mechanism will be described in greater detail hereinafter.

The front base plate 21 is also provided with front positioning wheels 34 by means of shafts 35. The positioning wheels 34 engage both sides of a holding member 11' located outside the water supply line 11 so that the machine 10 will always be guided and centered by the holding member 11' to be located above the water supply line 11.

The rear base plate 22 includes rear wheels 36 and rear positioning wheels 37 which are connected to the base plate 22 by means of shafts 38, 39 respectively. Therefore, the irrigation machine 10 is located above the water supply line 11 and can be moved therealong.

Figure 5:
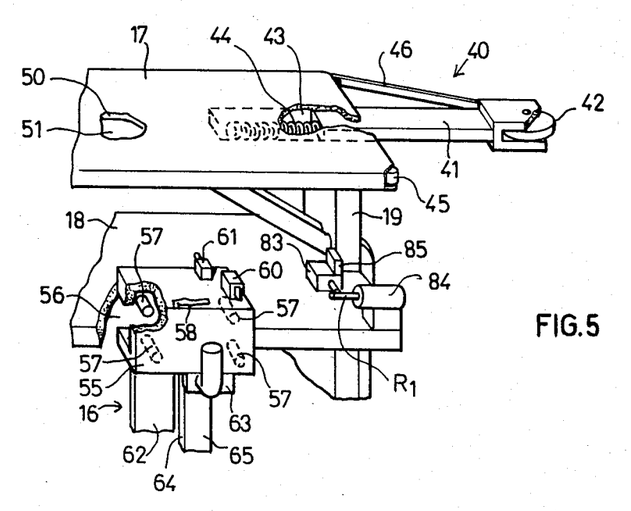
FIG. 5 is a partly broken perspective view showing a part of the irrigation machine.

As shown in FIG. 5, the upper plate 17 of the elongated frame 15 is at both longitudinal ends provided with tension members 40 movable in the longitudinal direction of the frame 15, each having a rod 41 and a roller 42. The upper plate 17 includes at each longitudinal end a hole 43 and a spring 44 to which the rod 41 of the tension member 40 is inserted and rollers 45 at the four corners of the upper plate 17. An endless belt 46 is disposed around the upper plate 17 to surround the rollers 42 of the tension members 40 and rollers 45. Therefore, the endless belt 46 is firmly situated around the upper plate 17 but can be freely moved relative thereto.

In this embodiment, only two tension members 40 are situated on the upper plate 17, but many tension members, such as six tension members can be attached to the plate 17. If six tension members are used, four tension members are located at the corners of the plate 17 instead of the rollers 45 to extend outwardly perpendicular to the longitudinal direction of the plate 17, and four direction change rollers are required beside the plate 17 to extend the endless belt along the longitudinal sides of the plate 17.

Figure 6:
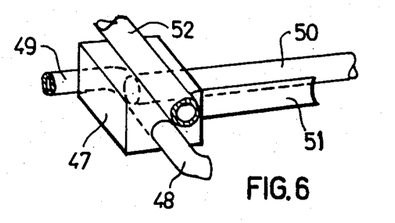
FIG. 6 is an explanatory perspective view of a box connected to the irrigation machine.

In the center of the upper plate 17, a box 47 is situated, to which flexible hoses 48, 49 are connected. Further, pipes 50, 51, 52 are attached to the box 47, the pipe 50 communicating with the hoses 48, 49 and extending to the hydraulic motor 32 and the pipe 51 connected between the motor 32 and the pipe 52 as clearly shown in FIG. 6. The pipe 52 is provided with couplings 53 at both ends thereof, which are connected to pipes S3 of the sprinkler assembly S. As explained later, at least one of the flexible hoses 48, 49 communicates with the water supply line 11 through one of the valve assemblies 12, so that water flows into the motor 32 through the hoses 48, 49 and the pipe 50, and is ejected from the sprinkler nozzles S2 passing through the pipes 51, 52 and S3. Thus, water in the water supply line 11 passes through the hydraulic motor 32 and is discharged from the sprinkler nozzles S2. Therefore, the irrigation machine 10 can be moved at a constant speed without using a source of external energy.

If desired, however, the hoses 48, 49 can be directly connected to the pipe 52 to eject water from the sprinkler nozzles S2 directly, and the machine 10 can be moved instead of the hydraulic motor 32 by any other means, such as an electric motor, internal combustion engine or the like.

The connector mechanisms 16, 16' are situated at longitudinal sides of the frame 15 to be symmetrically located relative to each other. Namely, the connector mechanism 16 is located in the front side and the connector mechanism 16' is located in the rear side when viewing the machine 10 as shown in FIG. 1. The connector mechanisms 16, 16' are exactly the same, so that only mechanism 16 is described in detail, but when referring to elements in mechanism 16', a "prime" has been added to the numeral.

The connector mechanism 16 includes a platform 55 having an opening 56 therein and four rollers 57 surrounding the opening 56 as shown in FIG. 5. The platform 55 is located on the lower plate 18 so that the opening 56 straddles an edge portion of the plate 18 and is laterally movable by means of the rollers 57. The platform 55 includes a plate 58 extending upwardly therefrom and which is connected to the endless belt 46. The platforms 55, 55' are connected to the endless belt 46 such that when the platform 55 is located at a front end, the platforms 55' is located at a rear end. Therefore, when one platform is moved in one direction along the longitudinal direction of the frame 15, the other platform is thereby moved in the opposite direction.

Figure 8:
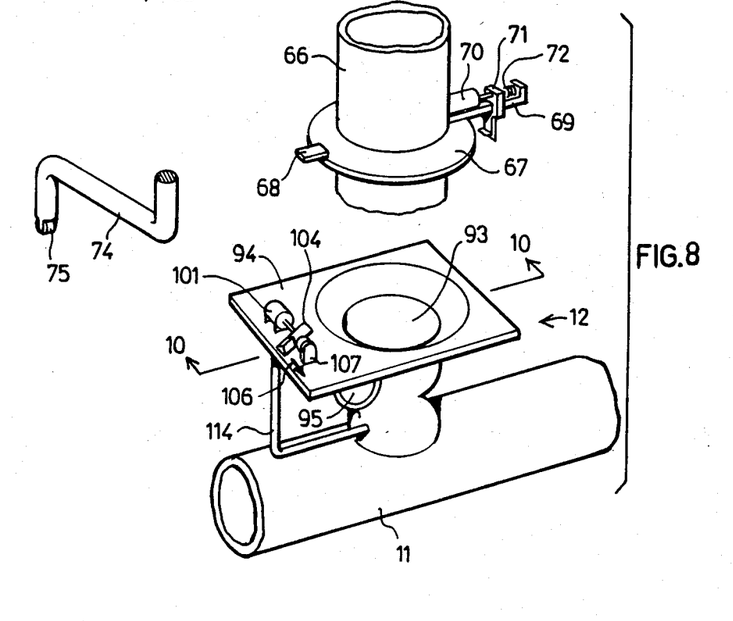
FIG. 8 is an enlarged perspective view of a connector pipe, a rod and a valve assembly.
Figure 9:
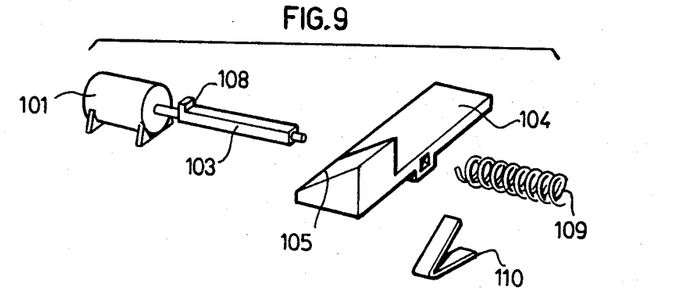
FIG. 9 is an exploded view of a switch mechanism of the valve assembly.

The platform 55 is provided on the upper portion thereof with an actuating switch 60 and a stop switch 61 (FIG. 5), and on the lower portion a supporting plate 62, a valve container 63 and a cylinder 64. The flexible hose 48 is connected to the valve container 63 at one end and to the box 47 at the opposite end, while the flexible hose 49 extends from the valve container 63' to the box 47. A pipe 65 extends downwardly from the valve container 63, and an extensible connector pipe 66 is connected to the pipe 65. As shown in FIG. 8, the connector pipe 66 includes a flange 67, a projection 68 connected to the flange 67, and a support rod 69 connected to the flange 67 having thereon a cylinder 70, a movable hook 71 and a spring 72, which operate to firmly engage the connector pipe 66 with the valve assembly 12 as will be hereinafter explained in greater detail.

The supporting plate 62 is provided with a cylinder 73 having a rod 74 with a roller 75. When the cylinder 73 is actuated, the rod 74 extends to its maximum position and then returns to a first position to disengage the connector pipe 66 with the valve assembly 12 as will be explained later.

Figure 3:
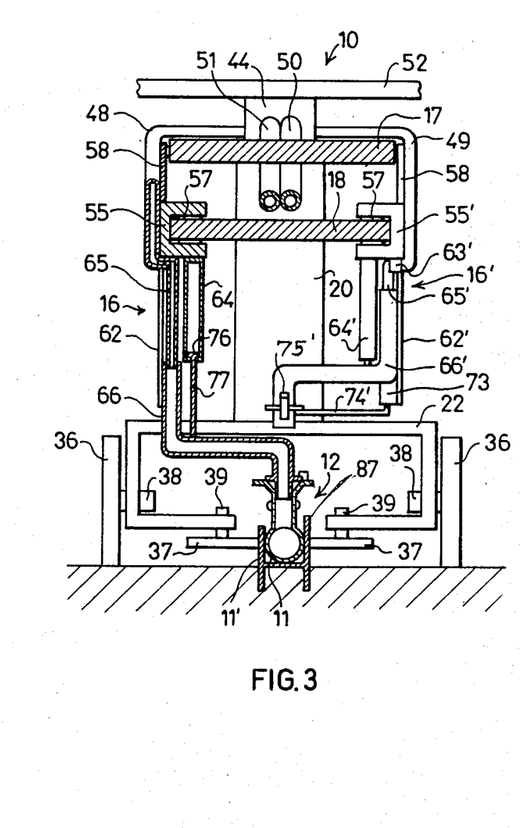
FIG. 3 is an enlarged section view taken along the line 3—3 in FIG. 1.

As shown in FIG. 3, the cylinder 64 includes a piston 76 and a piston rod 77 connected to the connector pipe 66. The cylinder 64 is actuated to move the connector pipe 66 up and down to engage or disengage the pipe 66 with the valve assembly 12.

Figure 7:
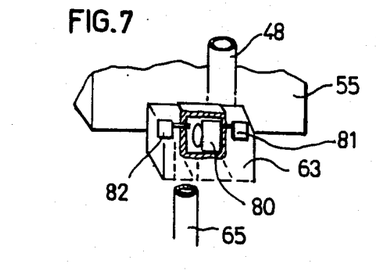
FIG. 7 is an explanatory perspective view of a valve container attached to a platform of the irrigation machine.

In the valve container 63, as shown in FIG. 7, a one-way valve 80 is located to allow water to flow from the pipe 65 toward the flexible hose 48. If water flows from the hose 48 to the pipe 65, the valve 80 closes to prevent flow of water in that direction. The valve 80 is connected to a flow detection switch 81 for detecting water flow in the valve container 63, and to a non-flow detection switch 82 for detecting no-water-flow in the container 63. This will be explained in greater detail hereinafter.

Figure 2:
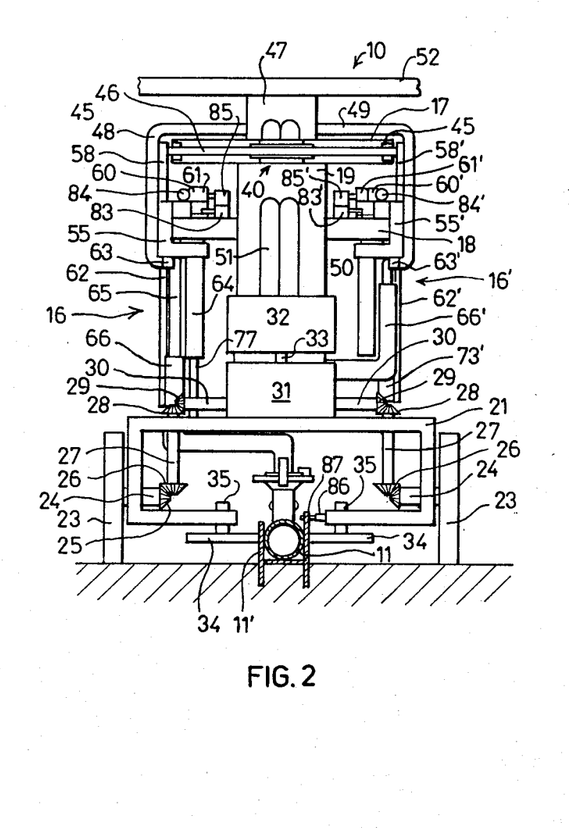
FIG. 2 is an enlarged section view taken along the line 2—2 in FIG. 1.

On the forward end of the lower plate 18, a positioning switch 83 and an operation switch 84 for operating the actuating switch 60 are situated. The positioning switch 83 detects the position of the platform 55 on the lower plate 18. At the opposite side of the lower plate 18 relative to the vertical plate 19, the positioning switch 83' and the operation switch 84' are also located for detecting the platform 55'. A stop plate 85 is disposed on the positioning switch 83 to actuate the stop switch 61 on the platform 55. As shown in FIG. 2, a positioning switch 86 is also disposed on the front base plate 21. The positioning switch 86 is operated by a projection 87 located on the holding member 11' beside the valve assembly 12 to detect the position of the irrigation machine 10.

As shown in FIGS. 8-13, the valve assembly 12 is connected to the water supply line 11 and includes a valve body 90 having an inner opening 91 defining an inner chamber 92 and an outer opening 93 diverging outwardly therefrom having a flange 94. A cover plate 95 is connected to a side portion of the valve body 90 to define a pressure chamber 96 between the cover plate 95 and a diaphragm 97. The cover plate 95 slidably supports a rod 98 which extends through a wall of the valve body 90. The rod 98 includes a valve 99 at one end sealingly disposed on the opening 91. The rod 98 is urged toward the inner opening 91 by means of a spring 100 and is also connected to the diaphragm 97. When the valve 99 is located on the inner opening 91, water does not flow through the valve assembly 12. When the connector pipe 66 is engaged with the outer opening 93, the valve 99 is opened and water flow therethrough.

Figures 10, 11:
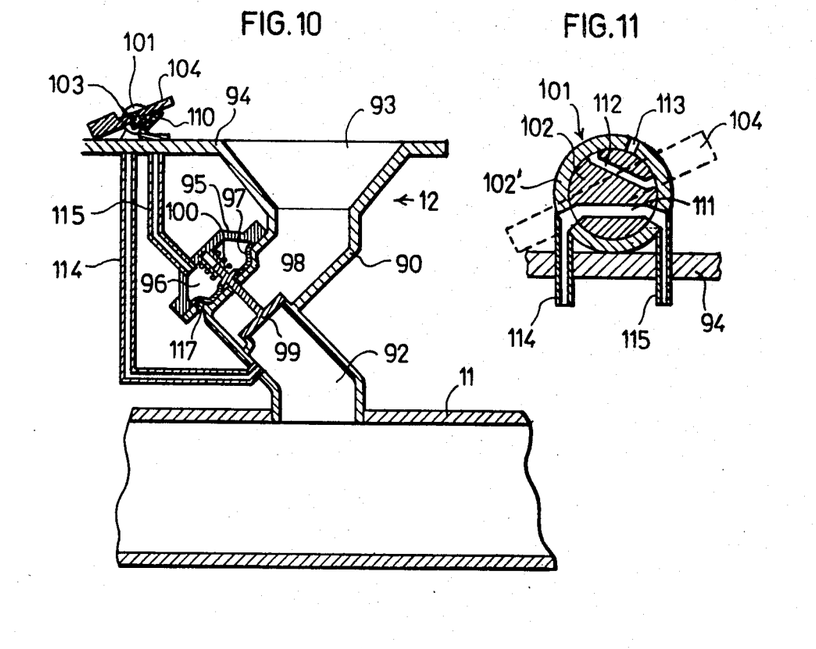
FIG. 10 is a sectional view taken along the line 10—10 in FIG. 8.
FIG. 11 is an enlarged sectional view of a rotary switch in the position as shown in FIG. 10.

The flange 94 is provided with a rotary switch 101 thereon having a rotor 102, a cover 102' for the rotor 102, a rectangular rod 103 connected to the rotor 102, and a plate 104 slidably disposed on the rod 103. The plate 104 includes an inclined face 105 so that when the face 105 is pushed, the plate 104 moves in a direction indicated by arrow 106 (FIG. 8). When the rotary switch 101 is disposed on the flange 94, an end of the rod 103 is supported by a support plate 107, and the plate 104 is urged into a stop 108 on the rod 103 by means of a spring 109. Also, the plate 104 is generally biased by a spring 110 as shown in FIG. 10. This position is shown in FIG. 11 which is a sectional view of the switch 101.

The rotor 102 is provided with passageways or paths 111, 112 therein, and the cover 102' includes an opening 113. A line 114 extends from the valve body 90 at the inner chamber 92 to the cover 102', and a line 115 extends from the cover 102' to the plate 95 and the pressure chamber 96.

Accordingly, when the rotor 102 is located in a normal position as shown in FIGS. 10 and 11 in which the plate 104 is biased by the spring 110, water in the inner chamber 92 flows into the pressure chamber 96 through the line 114, the path 111 and the line 115. The pressure in the pressure chamber 96 is therefore equal to that in the inner chamber 92. However, since the spring 100 is disposed in the pressure chamber 96 to urge the rod 98 toward the inner opening 91, the valve 99 is therefore moved to the inner opening 91 and closes the same.

Figure 12:
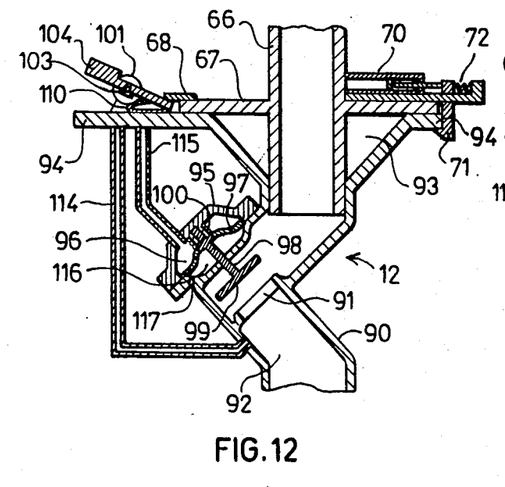
FIG. 12 is a sectional view of the valve assembly and the connector pipe when they are engaged.
Figure 13:
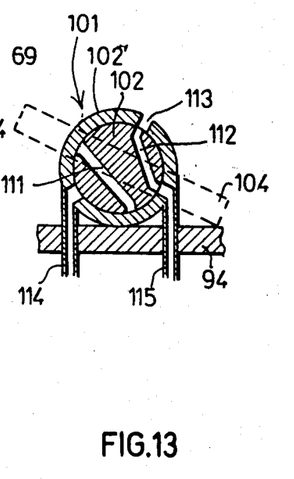
FIG. 13 is an enlarged sectional view of the rotary switch in a position as shown in FIG. 12.

On the other hand, when the plate 104 is pushed by the projection 68 of the flange 67 due to engagement of the connector pipe 66 with the valve assembly 12 as shown in FIG. 12, water in the inner chamber 92 does not flow into the pressure chamber due to movement of the rotor 102. Since water pressure in the inner chamber 92 is greater than the biasing pressure of the spring 100, the valve 99 is pushed back or opened so that water flows through the inner opening 91. At this time, water in the pressure chamber 96 is exhausted through the line 115, the path 112 and the opening 113. Air can enter into space 116 (FIG. 12) through an opening 117. If the rotor 102 is again rotated as shown in FIGS. 10, 11, water flows into the pressure chamber 96 so that the valve 99 is moved by the pressure of the spring 100 toward the inner opening 91 to close the same. Therefore, water will not flow through the valve assembly 12.

In operation, when one of the connector mechanism 16, 16' is connected to the valve assembly 12, water in the water supply line 11 flows through the hydraulic motor 32 and is discharged from the sprinkler nozzles S2 through the pipe 52. Consequently, the irrigation machine 10 moves in the direction shown by arrow 13. In the following explanation of the operation of the machine 10, the valve assemblies 12 as shown in FIG. 1 will be referred to as the first to third valve assemblies 12 from left to right in that order. The operation will be described, therefore, based on FIG. 1.

In the machine 10 in FIG. 1, the connector pipe 66 of the connector mechanism 16 is connected to the second valve assembly 12 at the front end of the frame 15. In this position, in the case where the connector mechanism 16' has been engaged with the first valve assembly 12, the connector mechanism 16' has to be disengaged from the first valve assembly 12. Since the machine 10 moves forwardly and the mechanism 16 is engaged with the second valve assembly 12, the mechanism 16 maintains its position relative to the second valve assembly 12. Consequently, the mechanism 16 appears to move rearwardly relative to the frame 15 and the mechanism 16' appears to move forwardly. The machine 10 continues to move forwardly, and when the mechanism 16 eventually moves to the rear end, the mechanism 16' is located at the forward end of the frame 15 just above the third valve assembly 12. In this position, the mechanism 16' is connected to the third valve assembly 12, and the mechanism 16 is disengaged from the second valve assembly 12. In this way, the machine 10 is successively and progressively connected to and disconnected from the valve assemblies 12.

Figure 4:
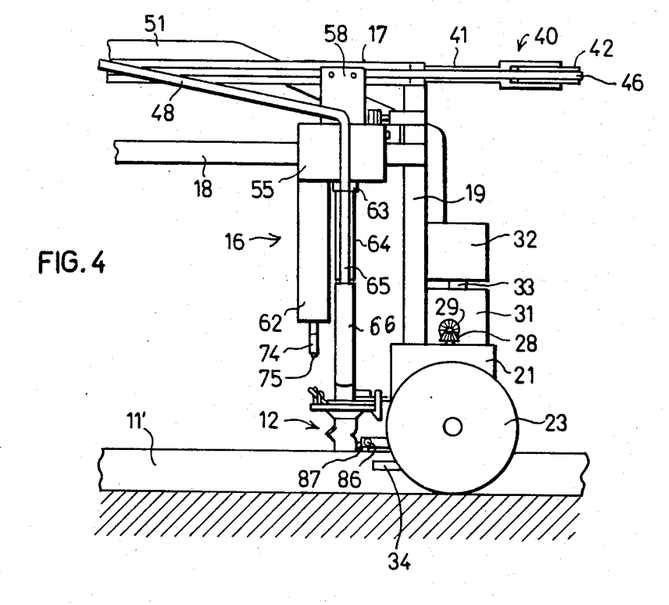
FIG. 4 is an enlarged side view showing a part of the irrigation machine.

In particular, when the mechanism 16' is connected to the first valve assembly 12 and the mechanism 16 moves to the front end of the frame 15, the platform 55 pushes the positioning switch 83 on the lower plate 18 (FIG. 5). In this position, when the machine 10 is located at the proper position relative to the second valve assembly 12, the positioning switch 86 on the front base plate 21 is actuated by the projection 87 on the holding member 11' (FIGS. 2,4). Only when both positioning switches 83, 86 are actuated at the same time, the operation switch 84 on the lower plate 18 operates to push a rod R1 forwardly (FIG. 5). Consequently, the actuating switch 60 on the platform 55 is actuated. The positioning switches 83, 86 and the operation switch 84 are internally connected for fluid communication with each other, and when the switches 83, 86 are actuated, water pressure pushes the rod R1 of the operation switch 84. When the positioning switch 83', 86 operate, the operation switch 84' is actuated for the mechanism 16'.

When the actuating switch 60 is actuated, the cylinder 64 operates to extend the connector pipe 66 downwardly, so that the pipe 66 is engaged with the second valve assembly 12. The cylinder 64 is actuated by water received from the hose 48, and the cylinder 48' is actuated by water received from the hose 49. When the pipe 66 is engaged with the second valve assembly 12, the hook 71 is pushed outwardly against the spring 72 and returns by the spring 72, so that the hook 71 is engaged with the flange 94 on the second valve assembly 12 to firmly engage the pipe 66 with the valve assembly 12. Further, when the pipe 66 is engaged with the second valve assembly 12, the projection 68 pushes down the plate 104 (FIG. 12). Consequently, the inner opening 91 opens as explained before, and water flows through the inner opening 91 into the pipe 66. As long as the plate 104 is held in the pressed position, water flows through the pipe 66 and the hose 48 to sprinkle water on the ground through the sprinkler nozzles S2.

When the pipe 66 is connected to the second valve assembly 12, the pipe 66' of the connector mechanism 16' is still engaged with the first valve assembly 12. Therefore, the pipe 66' has to be disengaged from the first valve assembly 12.

When water flows through the pipe 66 to the hose 48, water passes through the valve container 63, so that one-way valve 80 is opened to thereby operate the flow detection switch 81. The flow detection switch 81 actuates the cylinder 73′ of the connector mechanism 16′. The cylinder 73′ is actuated by water received from the hose 49, and the cylinder 73 is actuated by water received from the hose 48. Consequently, the rod 74′ extends to the maximum length and returns to the first position, so that the roller 75′ connected to the lower end of the rod 74′ pushes the inclined face 105 of the plate 104 at the first valve assembly 12 to disengage the plate 104 with the projection 68′ at the pipe 66′. When the face 105 is pushed by the roller 75′, the plate 104 moves laterally to disengage the projection 68′. The plate 104 returns to the position urged by the spring 110 as shown in FIG. 10.

Consequently, the valve 99 is engaged with the inner opening 91 as explained before, and the first valve assembly 12 is closed. Therefore, water does not flow through the valve container 63′ at the connector mechanism 16′, so that the valve 80′ is closed, whereby the non-flow detection switch 82′ operates. The non-flow detection switch 82′ actuates the cylinder 70′ to move the hook 71′ outwardly by water from the hose 49 in spite of the force of the spring 72′, and the cylinder 64′ to retract the pipe 66′ out of the first valve assembly 12. Since the hook 71′ does not engage the flange 94, the pipe 66′ can be moved to the retracted position.

Consequently, the irrigation machine 10 moves forwardly without obstruction, and when the connector mechanism 16 comes to the rear end of the frame 15, the connector mechanism 16′ is located at the forward end of the frame 15 above the third valve assembly 12. The connector mechanism 16′ is connected to the third valve assembly 12 and the connector mechanism 16 is disengaged from the second valve assembly 12 as explained above.

When the connector mechanism 16 comes to the forward and of the frame 15, for example, if the positioning switch 83 or 86 does not operate to thereby not operate the actuating switch 60 by the operation switch 84, the platform 55 still moves forwardly. Consequently, the stop switch 61 operates to actuate the cylinder 73′ to disengage the plate 104 with the projection 68′ of the pipe 66′. Thus, water does not flow through the valve assembly and the irrigation machine stops.

When it is desired to stop the irrigation machine 10, the stop switch 61 may be manually operated. If the machine 10 is stopped, the valve assembly 12 is closed so that water cannot flow therethrough as stated above, but the pipe 66 is still engaged with the valve assembly 12. Therefore, when the machine 10 is again started, the plate 104 has to be manually pushed to open the valve assembly 12. The machine 10 will automatically operate again.

Engagement and disengagement of the pipes 66, 66′ with the valve assemblies occurs in a few seconds, so while the irrigation machine 10 is moving at constant speed, the engagement and disengagement occur in order. Since the connector mechanisms 16, 16′ are connected to the endless belt 46 having the tension members 40, undesirable movement of the connector mechanisms 16, 16′ relative to the frame 15 due to the engagement and disengagement of the mechanisms 16, 16′ with the valve assemblies 12 can be absorbed by the tension members 40. When the irrigation machine is moved at constant speed, water is sprinkled from the sprinkler nozzles S2.

While the invention has been described with reference to the specific embodiments of the invention, it is to be noted that the description is illustrative and the invention is limited only by the appended claims.

What I claim is:

1. Irrigation machine adapted to receive water from a water supply line located on the ground having thereon a plurality of valve assemblies equally spaced from each other comprising:

a base frame movable over the ground along said water supply line;

propelling means provided on said base frame for moving the base frame along the water supply line;

water transfer means mounted on said base frame for distributing water over the ground;

a coupling assembly carried by said base frame, said coupling assembly having at least two coupling sections connected to each other to freely move relative to said base frame so that when one of the coupling sections is moved in one direction along the longitudinal direction of the base frame, the other coupling section is thereby automatically moved in the opposite direction along the longitudinal direction of said base frame;

and means connecting said two coupling sections to said water transfer means supplying water thereto when either coupling section is connected to the water supply line by one of said valve assemblies; each of said two coupling sections including: first position detection means for detecting when the respective coupling section has reached the end of the base frame; second position detection means for detecting when the respective coupling section overlies a valve assembly; drive means for driving its respective coupling section to an extended position for engagement with a valve assembly, or to a retracted position for disengagement from a valve assembly; valve means controlling the flow of water from a connected valve assembly to the respective coupling section; flow detection means for detecting the flow of water from a connected valve assembly to the respective coupling section; and control means controlled by said first and second position detection means such that when said first position detection means of one coupling section detects that its coupling section has reached the end of the base frame, and said second position detection means detects that the respective coupling section overlies a valve assembly, they together actuate the drive means for the respective coupling section to extend same into engagement with the respective valve assembly, to cause the valve means for the respective coupling section to open and to produce a flow of water to the respective coupling section, whereupon the flow detection means for the respective coupling section closes the valve means of the other coupling section and actuates the drive means of the other coupling section to retract same from the previously-coupled valve assembly.

2. The irrigation machine according to claim 1, wherein said first position detection means comprises a first position switch engaged by the respective coupling section when it has reached the end of the base frame, and wherein said second position detection means comprises a second position switch engaged by a projection adjacent to each valve assembly of the water supply line when the respective coupling section overlies the respective valve assembly.

3. The irrigation machine according to claim 1, wherein said propelling means comprises a pair of front propelling wheels at the front of the base frame, and a pair of rear propelling wheels at the rear of the base frame, said base frame further including a front pair of horizontally-extending guiding wheels and a rear pair of horizontally-extending guiding wheels, both pairs of guiding wheels being engageable with the sides of the water supply line for guiding the base frame as it is propelled along the water supply line by the propelling wheels.

4. The irrigation machine according to claim 1, wherein said control means comprises an operation switch effective to actuate the drive of the respective coupling section when its first and second position detection means are actuated.

5. The irrigation machine according to claim 4, wherein said control means further comprises a stop switch actuated, whenever only one of said two position detection means is actuated, to close said valve means of the connecting coupling sections and to retract same from the valve assembly, without driving the disconnected coupling section into engagement with the next valve assembly.

6. The irrigation machine according to claim 5, wherein said propelling means include a hydraulic motor supplied by pressurized water from the water supply line whenever one of the coupling sections is connected to one of said valve assemblies and is supplied 7. The irrigation machine according to claim 6, wherein said stop switch is also manually actuatable to manually terminate the operation of the apparatus.

8. The irrigation machine according to claim 1, wherein said coupling assembly comprises an endless belt freely movable around the base frame and supporting said two coupling sections, each of said coupling sections comprising a platform movable relative to the base frame and connector members attachable to each platform; each connector member having a first end connected to said water transfer means, a second end adapted to be selectively connected to one of said valve assemblies of said water supply line, and connector actuation means for engaging and disengaging said second end to the valve assembly.

9. The irrigation machine according to claim 8, wherein said second ends of the connector members of the two coupling sections are mounted to opposite sides of the endless belt and are offset to overlie the valve assemblies without interfering with each other as they move in opposed directions with respect to said base frame.

10. The irrigation machine according to claim 8, wherein each of said coupling sections comprises locking means attached to said second end of said connector members, for firmly engaging same with the valve assembly when connected thereto.

* * * * *